(12) United States Patent
Gray et al.

(10) Patent No.: US 10,007,015 B2
(45) Date of Patent: Jun. 26, 2018

(54) METHODS, SYSTEMS AND DEVICES FOR PREDICTING RESERVOIR PROPERTIES

(71) Applicant: Nexen Energy ULC, Calgary (CA)

(72) Inventors: Frederick David Gray, Calgary (CA); Dragana Todorovic-Marinic, Calgary (CA); Byron Matthew Kelly, Calgary (CA)

(73) Assignee: NEXEN ENERGY ULC, Calgary, Alberta (CA)

( * ) Notice: Subject to any disclaimer, the term of this patent is extended or adjusted under 35 U.S.C. 154(b) by 484 days.

(21) Appl. No.: 14/628,812

(22) Filed: Feb. 23, 2015

(65) Prior Publication Data
US 2016/0245065 A1     Aug. 25, 2016

(51) Int. Cl.
*G01V 1/30* (2006.01)
*G01V 1/50* (2006.01)
*G01V 11/00* (2006.01)

(52) U.S. Cl.
CPC .............. *G01V 1/303* (2013.01); *G01V 1/306* (2013.01); *G01V 1/308* (2013.01); *G01V 1/50* (2013.01); *G01V 11/00* (2013.01); *G01V 2210/1212* (2013.01); *G01V 2210/1295* (2013.01); *G01V 2210/1299* (2013.01); *G01V 2210/1425* (2013.01); *G01V 2210/1429* (2013.01);
(Continued)

(58) Field of Classification Search
CPC ...... G01V 2210/64; G01V 1/306; G01V 1/50; G01V 1/48; G01V 11/00; G01V 11/002; G01V 1/303; G01V 1/308; E21B 47/00; E21B 47/0003
See application file for complete search history.

(56) References Cited

U.S. PATENT DOCUMENTS

2006/0092766 A1   5/2006 Shelley et al.
2012/0109597 A1   5/2012 Derfoul et al.
(Continued)

FOREIGN PATENT DOCUMENTS

WO     2013172948 A1    11/2013
WO   WO 2016134443 A1 *  9/2016  ............... G01V 9/00

OTHER PUBLICATIONS

International Searching Authority, International Search Report and Written Opinion dated Nov. 3, 2015, in International Application No. PCT/CA2015/050134.

*Primary Examiner* — Joseph C Nicely
(74) *Attorney, Agent, or Firm* — Norton Rose Fulbright Canada LLP

(57) ABSTRACT

Methods, devices and computer-readable media for predicting hydrocarbon production rates for a subterranean formation are described. A method includes: receiving or generating, by at least one processor, well logs from data collected from at least one well in the subterranean formation; generating from the well logs a predicted production rate log for the at least one well; receiving, by the at least one processor, a field dataset for the subterranean formation, the field dataset including field data at locations in 3-dimensions of a volume of the subterranean formation; identifying the predicted production rate log for the at least one well as one or more targets, determining a transform relating the field data and the predicted rate log for the at least one well; and using the transform, generating a predicted production rate for each location of the volume of the subterranean formation.

22 Claims, 12 Drawing Sheets

(52) U.S. Cl.
   CPC .. *G01V 2210/161* (2013.01); *G01V 2210/624* (2013.01); *G01V 2210/6222* (2013.01); *G01V 2210/6224* (2013.01); *G01V 2210/64* (2013.01); *G01V 2210/641* (2013.01); *G01V 2210/644* (2013.01); *G01V 2210/645* (2013.01)

(56) References Cited

U.S. PATENT DOCUMENTS

| | | | |
|---|---|---|---|
| 2012/0179379 A1 | 7/2012 | Alshawaf et al. | |
| 2012/0239363 A1* | 9/2012 | Durrani | E21B 43/00 |
| | | | 703/10 |
| 2013/0124171 A1 | 5/2013 | Schuette et al. | |
| 2013/0140031 A1* | 6/2013 | Cohen | E21B 43/26 |
| | | | 166/308.1 |
| 2016/0178785 A1* | 6/2016 | Wilson | E21B 49/08 |
| | | | 324/324 |
| 2016/0215606 A1* | 7/2016 | Okoroafor | E21B 49/003 |
| 2016/0222766 A1* | 8/2016 | Rowan | E21B 43/00 |
| 2016/0312552 A1* | 10/2016 | Early | G05B 13/041 |
| 2017/0032064 A1* | 2/2017 | Walsh | E21B 47/00 |

\* cited by examiner

METHODS, SYSTEMS AND DEVICES FOR PREDICTING RESERVOIR PROPERTIES

FIELD

The present application relates to the field of reservoir modeling, and particularly to methods, systems and devices for modeling subterranean dynamic reservoir properties based on collected physical data.

BACKGROUND

Hydrocarbon exploration involves trade-offs between the number and spacing of wells (and associated costs) and the accuracy of data which may impact production forecasting and resource development planning. Often geological properties obtained from various wells use average properties over a given area to provide an assessment of a reservoir. It some instances, estimating with averages may provide a limited picture of geological variations in a subterranean formation.

SUMMARY

In accordance with one aspect, there is provided a method of predicting hydrocarbon production rates for a subterranean formation. The method includes: receiving or generating, by at least one processor, well logs from data collected from at least one well in the subterranean formation; generating from the well logs a predicted production rate log for the at least one well; receiving, by the at least one processor, a field dataset for the subterranean formation, the field dataset including field data at locations in 3-dimensions of a volume of the subterranean formation; identifying the predicted production rate log for the at least one well as one or more targets, determining a transform relating the field data and the predicted rate log for the at least one well; and using the transform, generating a predicted production rate for each location of the volume of the subterranean formation.

In accordance with another aspect, there is provided a device for predicting hydrocarbon production rates for a subterranean formation. The device includes at least one processor configured for: receiving or generating well logs from data collected from at least one well in the subterranean formation; generating from the well logs a predicted production rate log for the at least one well; receiving a field dataset for the subterranean formation, the field dataset including field data at locations in 3-dimensions of a volume of the subterranean formation; identifying the predicted production rate log for the at least one well as one or more targets, determining a transform relating the field data and the predicted rate log for the at least one well; and using the transform, generating a predicted production rate for each location of the volume of the subterranean formation.

In accordance with another aspect, there is provided a non-transitory computer-readable medium or media having stored thereon, computer-readable instructions. The computer-readable instructions, when executed by at least one processor, configure the at least one processor for: receiving or generating well logs from data collected from at least one well in the subterranean formation; generating from the well logs a predicted production rate log for the at least one well; receiving a field dataset for the subterranean formation, the field dataset including field data at locations in 3-dimensions of a volume of the subterranean formation; identifying the predicted production rate log for the at least one well as one or more targets, determining a transform relating the field data and the predicted rate log for the at least one well; and using the transform, generating a predicted production rate for each location of the volume of the subterranean formation.

Many further features and combinations thereof concerning embodiments described herein will appear to those skilled in the art following a reading of the present disclosure.

DESCRIPTION OF THE FIGURES

In the figures.

DETAILED DESCRIPTION

In hydrocarbon development, accurate estimations of rates of production can help provide information regarding the value and/or viability of a project/resource. These estimations may also guide the number and location of wells. Due to the high cost of development, there can be significant financial incentives to have as much and as accurate information as possible. In some examples, it may be important to keep the cost and amount of time spent acquiring the information low.

In some estimation methods such as fractal contouring, average well values are determined and then can be geologically contoured by a geologist or computer algorithm to estimate information between wells.

In some embodiments, aspects of the present disclosure may provide more potentially accurate and/or more granular predicted rates of production based on measured geological properties between wells.

Figure 1:
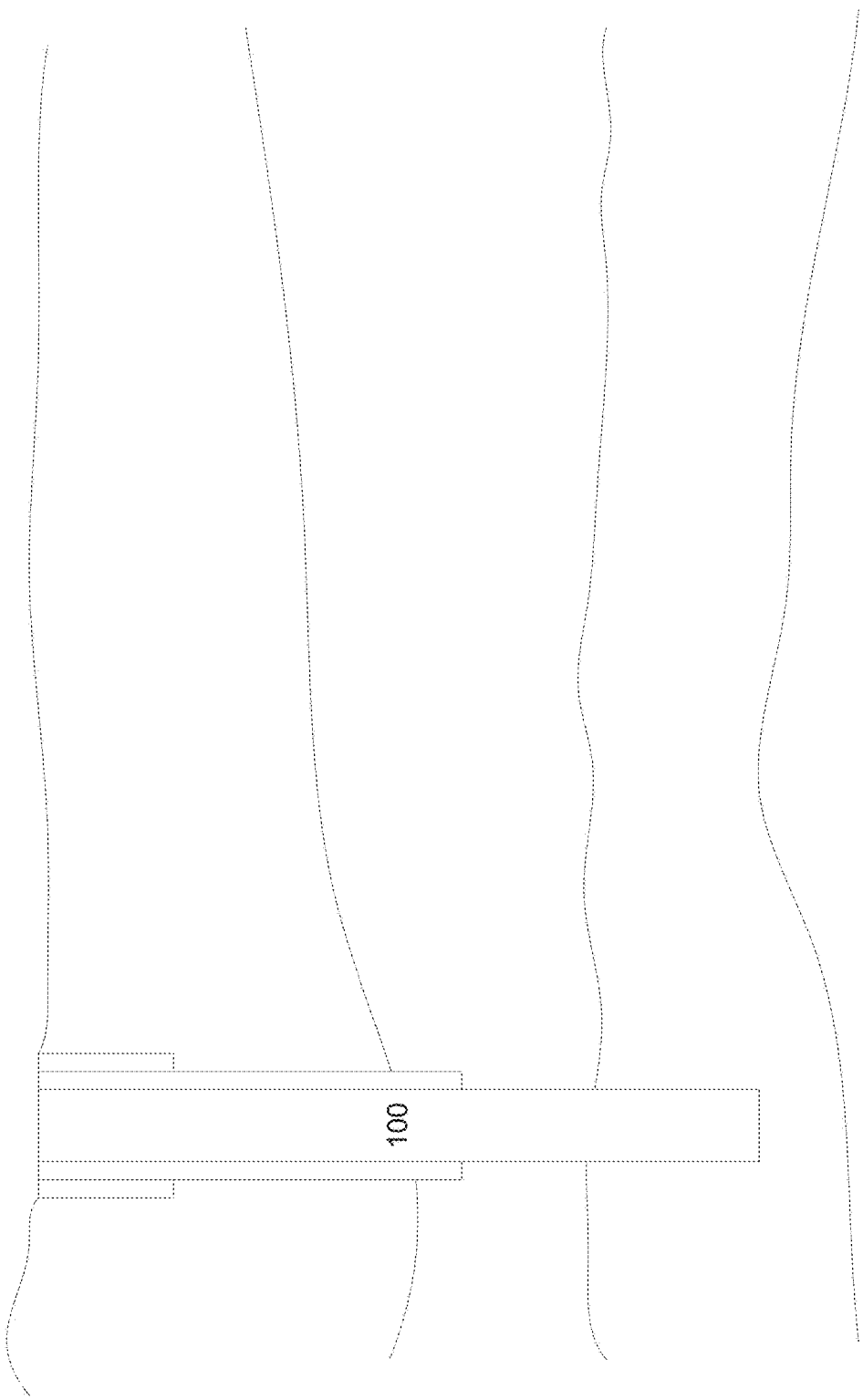
FIG. 1 is a cross sectional view of an example geological formation and well.

FIG. 1 illustrates a cross-sectional view of a subterranean resource or geological formation 110 which may include a number of different layers of materials having different physical characteristics as illustrated in FIG. 1 by the lines in the formation. It should be understood that these lines are illustrative only and that geological formations may have any number of layers or types of material which may not have distinct delineations but may be gradual or may contain mixtures or combinations of different material. There may also be lateral and/or vertical variations in the types of material contained within any of the geological formations.

In evaluating the subsurface or subterranean formations, in some examples, data can be collected from one or more wells 100 drilled into or around the formations. In some examples, the wells can be exploratory wells, production wells or wells for any other purpose. The wells can include vertical wells, horizontal wells, or any wells of any direction or structure, and/or any combination thereof.

In some examples, data collected from the well(s) 100 can include or can be used to create logs of the geologic formations penetrated by the well(s). The data can be collected from core samples or by measurements taken by devices in the borehole.

In some examples, the well data collected or generated from well measurements can include, but are not limited to, gamma ray logs, bulk density logs, neutron density logs, induction resistivity logs, and/or well core or image data.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code may be applied to input data to perform the functions described herein and to generate output information. The output information may be applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof. In some examples, devices having at least one processor may be configured to execute software instructions stored on a computer readable tangible, non-transitory medium.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Figure 2:
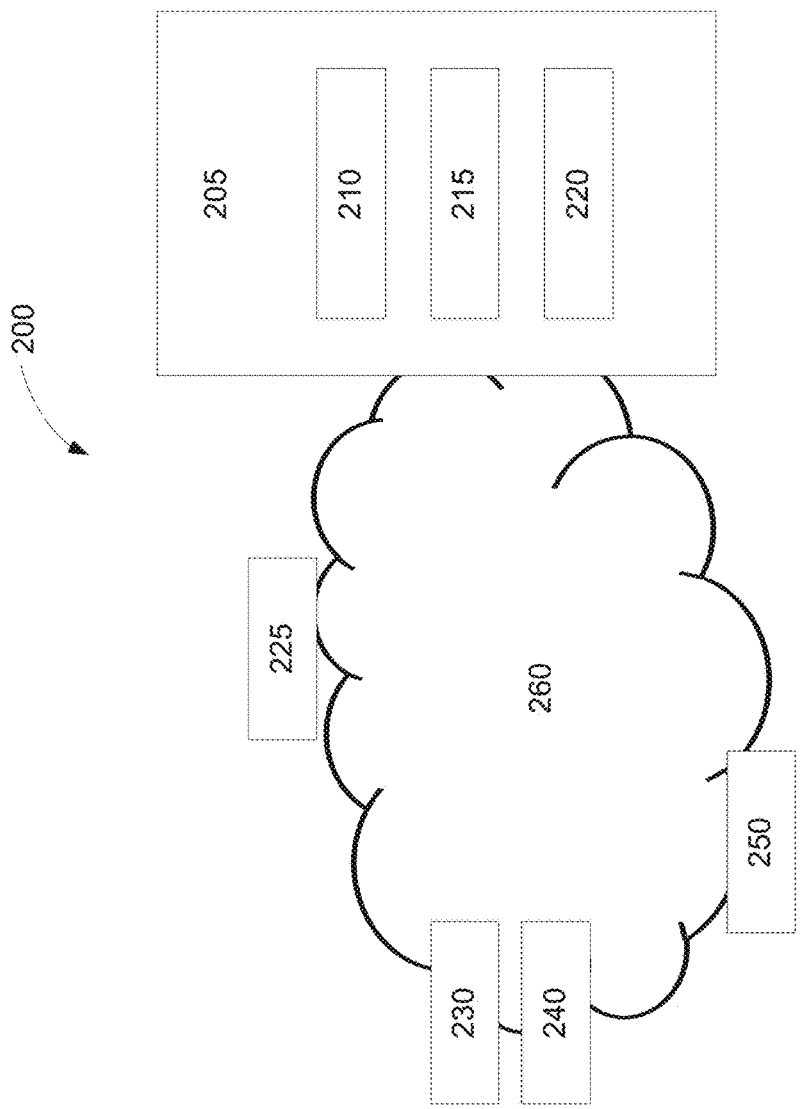
FIG. 2 is an example system to which aspects of the present disclosure may be applied.

FIG. 2 shows an example system 200 include one or more devices 205 which may be used to predict hydrocarbon production rates. In some examples, a device 205 may be a computational device such as a computer, server, tablet or mobile device, or other system, device or any combination thereof suitable for accomplishing the purposes described herein. In some examples, the device 205 can include one or more processor(s) 210, memories 215, and/or one or more devices/interfaces 220 necessary or desirable for input/output, communications, control and the like. The processor (s) 210 and/or other components of the device(s) 205 or system 250 may be configured to perform one or more aspects of the processes described herein.

In some examples, the device(s) 205 may be configured to receive or access data from one or more volatile or non-volatile memories 215, or external storage devices 225 directly coupled to a device 205 or accessible via one or more wired and/or wireless network(s) 260. In external storage device(s) 225 can be a network storage device or may be part of or connected to a server or other device.

In some examples, the device(s) 205 may be configured to receive or access data from sensors or devices 230 in the field. These sensors or devices 230 may be configured for collecting or measuring well, seismic or other geological and/or physical data. In some examples, the sensor(s)/device (s) 230 can be configured to communicate the collected data to the device(s) 205 and/or storage device(s) 225 via one or more networks 260 or otherwise. In some examples, the sensors or devices 230 may be connected to a local computing device 240 which may be configured to receive the data from the sensors/devices 230 for local storage and/or communication to the device(s) 205 and/or storage device(s) 225.

In some examples, a client device 250 may connect to or otherwise communicate with the device(s) 205 to gain access to the data and/or to instruct or request that the device(s) 205 perform some or all of the aspects described herein.

Figure 3:
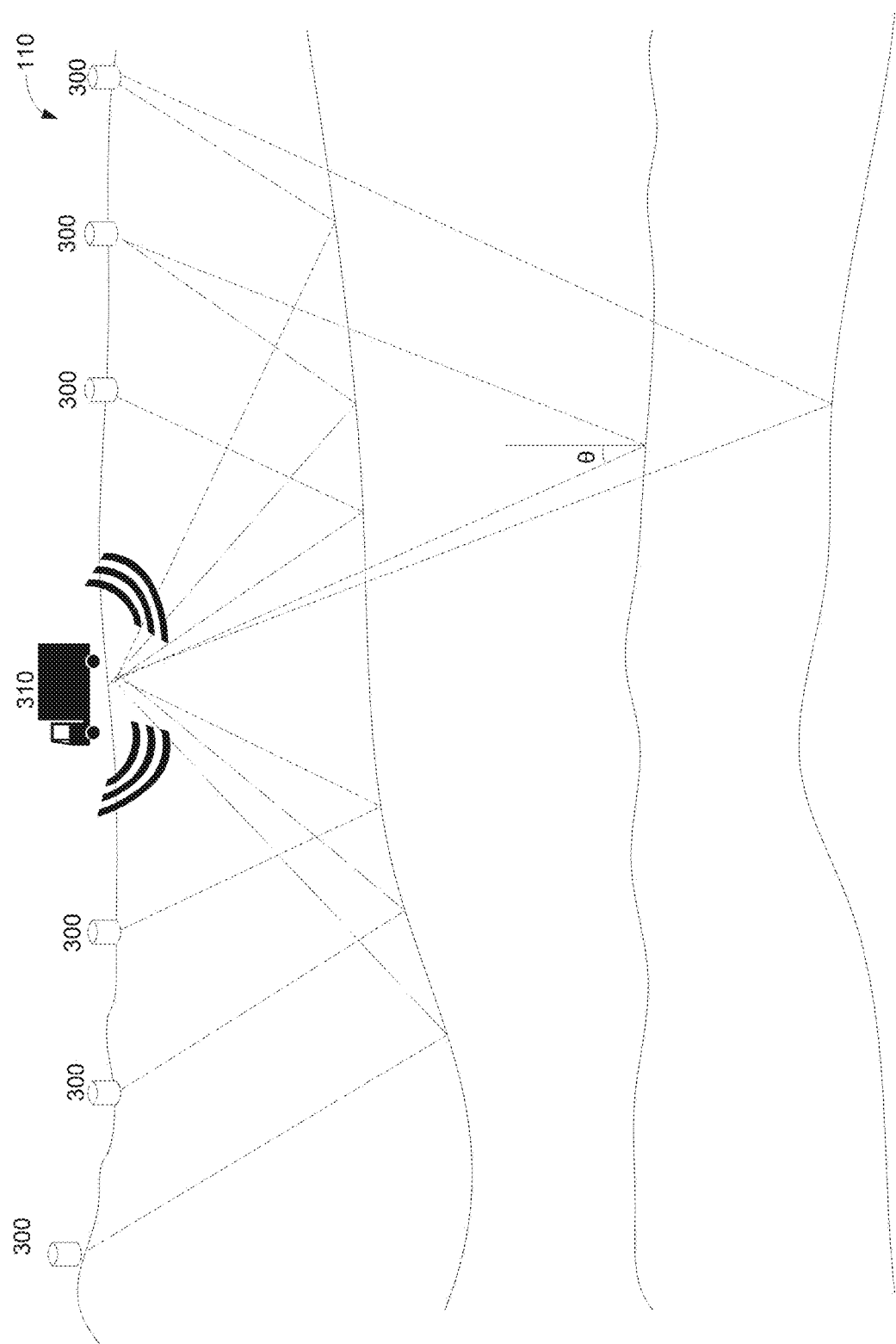
FIGS. 3 and 4 are cross sectional view of example geological formations including example energy sources and sensors.
Figure 4:
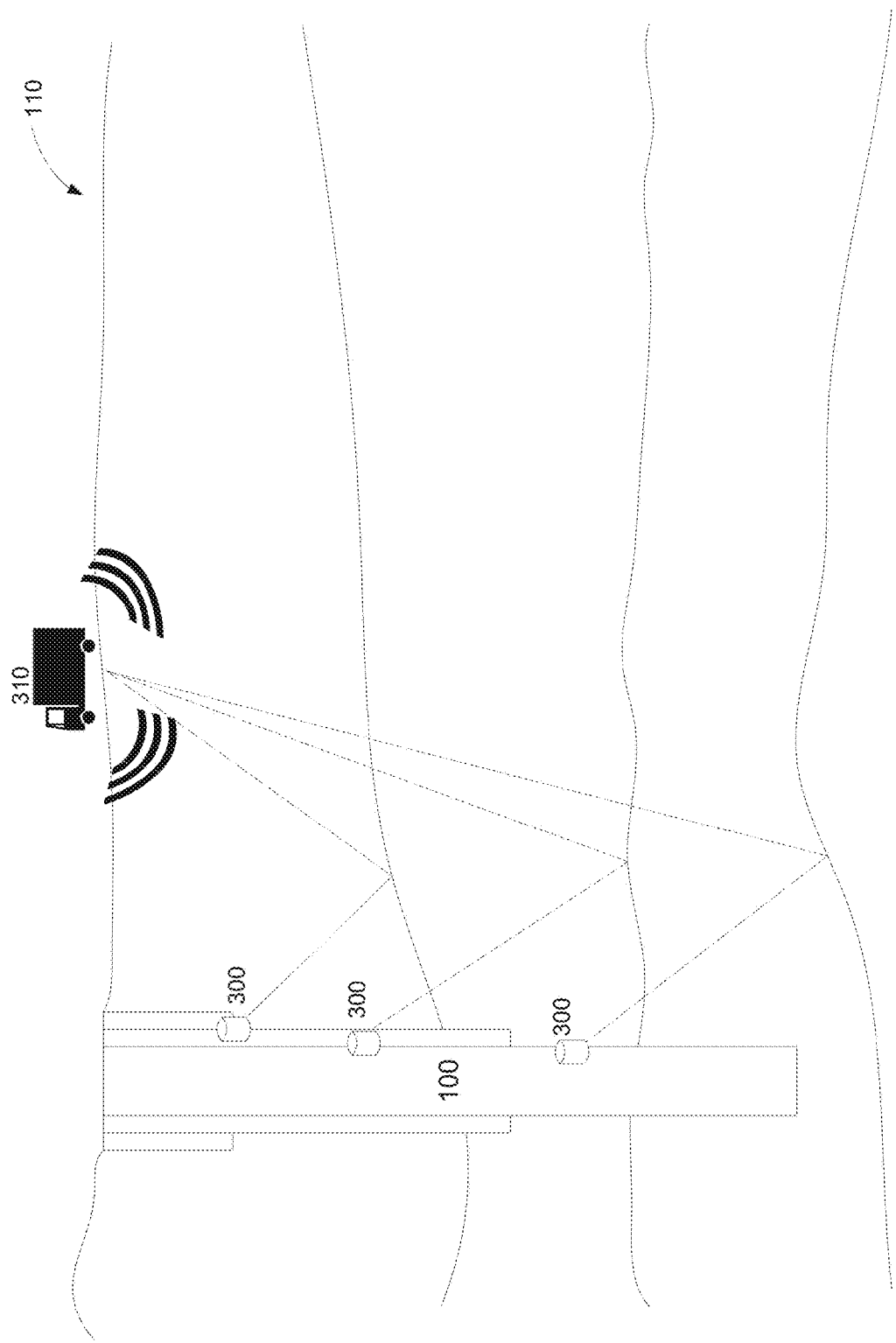

With reference to FIGS. 3 and 4, subterranean resource or geological formation data can be collected from the field to ascertain information between wells and/or information otherwise not provided by well log data.

Similar to FIG. 1, FIGS. 3 and 4 illustrate a cross-sectional views of a subterranean resource or geological formation 110 which may include a number of different layers of materials having different physical characteristics as illustrated by the lines in the formation. It should be understood that these lines are illustrative only and that geological formations may have any number of layers or types of material which may not have distinct delineations but may be gradual or may contain mixtures or combinations of different material. In some instances, each individual geological formation may have lateral and/or vertical variations in the types of materials of which they are comprised.

Field data may be used to create logs for porosity, saturation, permeability, and/or other similar static properties and has been used to create a sum or average for these attributes over a two-dimensional area. However, these averages or totals may provide a limited granularity as to the dynamic flow properties of a geological formation.

In FIG. 3, a controlled energy source 310 such as a seismic vibrator, dynamite or other explosive, air gun, or the like can be configured to generate seismic waves. Sensors 300 such as geophones, accelerometers, MEMS devices, seismometers, receivers and the like can be positioned at the surface or elsewhere to collect seismic data associated with the geological formation(s) 110 based on reflected or otherwise detected seismic waves.

In some examples, the sensors 300 can be positioned to generate a three-dimensional (3D) log or grid of data points for locations within the subterranean formation(s).

In some examples, the sensors 300 can be positioned such that reflected waves have a larger angle of incidence θ which can in some examples provide greater density information for the geological formations. In some examples, the amount of density information acquired from a detected wave may be a function of the sine of the angle of incidence. By way of example, the following is an equation relating density to the sine of the angle of impedance:

$$R(\theta) \approx \left(\frac{1}{2} + \frac{1}{2}\tan^2\theta\right)\left(\frac{\Delta\alpha}{\alpha} + \frac{\Delta\rho}{\rho}\right) - 4\frac{\beta^2}{\alpha^2}\left(\frac{\Delta\rho}{\rho} + \frac{\Delta\beta}{\beta}\right)\sin^2\theta + \left[2\frac{\beta^2}{\alpha^2}\sin^2\theta - \frac{1}{2}\tan^2\theta\right]\frac{\Delta\rho}{\rho}$$

where θ is the angle, R(θ) is the seismic response with angle, α is the average compressional wave velocity, β is the average shear wave velocity, ρ is the average density, and Δ is an operator indicating the change in the above properties across a boundary.

In some examples, one or more sensors 300 can be positioned to collect data from wide-angle waves such as waves having an angle of incidence of 45 degrees or greater to provide a desired level of density information. The sensors can also be positioned as a function of the depth of the target formation.

Any number or arrangement of sensors and energy source locations can be used to create the desired resolution of data points in the 3D volume of the formations.

FIG. 4 shows another example whereby sensors 300 can be positioned in a well to collect vertical seismic profile data. In another example, energy source(s) 310 can be positioned in a well, and sensors 300 can be positioned at the surface to collect reverse vertical seismic profile data. In another example, energy source(s) 310 can be positioned in one well, and sensors 300 can be positioned in a second well to collect cross-well seismic data.

In some examples, combinations of seismic or other field data collected from any number of source/sensor arrangements can be combined to create one or more field data sets.

In some examples, field data regarding the subterranean formations can be additionally or alternatively collected. Such data can include electromagnetic data, gravity data and the like.

Any subset or combination of the aforementioned data sources may be used to collect field data for use in the prediction of hydrocarbon production rates.

Figure 5:
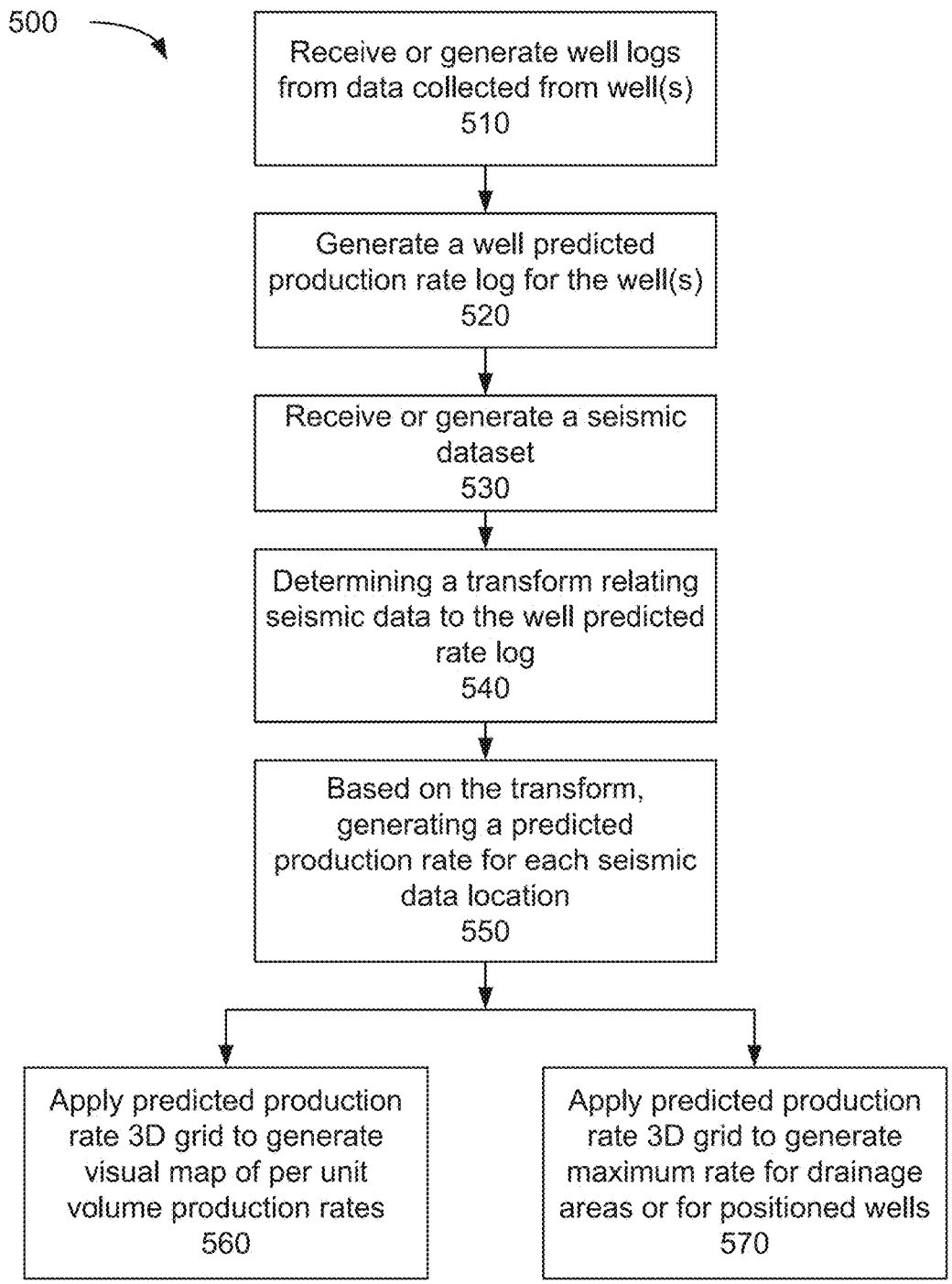
FIGS. 5, 6 and 7 are flowcharts illustrating aspects of an example method for predicting reservoir properties.

FIG. 5 shows a flowchart illustrating aspects of an example method 500 for predicting hydrocarbon production rates for a subterranean resource. At 510, one or more processor(s) 210 and/or other aspects of device(s) 205 may be configured to receive or generate well logs from data collected from at least one well in the subterranean formation 110.

In some examples, the well logs can be received or accessed from one or more memories 215, storage devices 215, 225, and/or sensors or field devices 230, 240. In some examples, the well logs can include gamma ray well log(s), bulk density well log(s), neutron density well log(s), resistivity well log(s), core and/or well image data, nuclear magnetic resonance log(s), and/ or any other well log that can be measured in the well.

Figure 6:
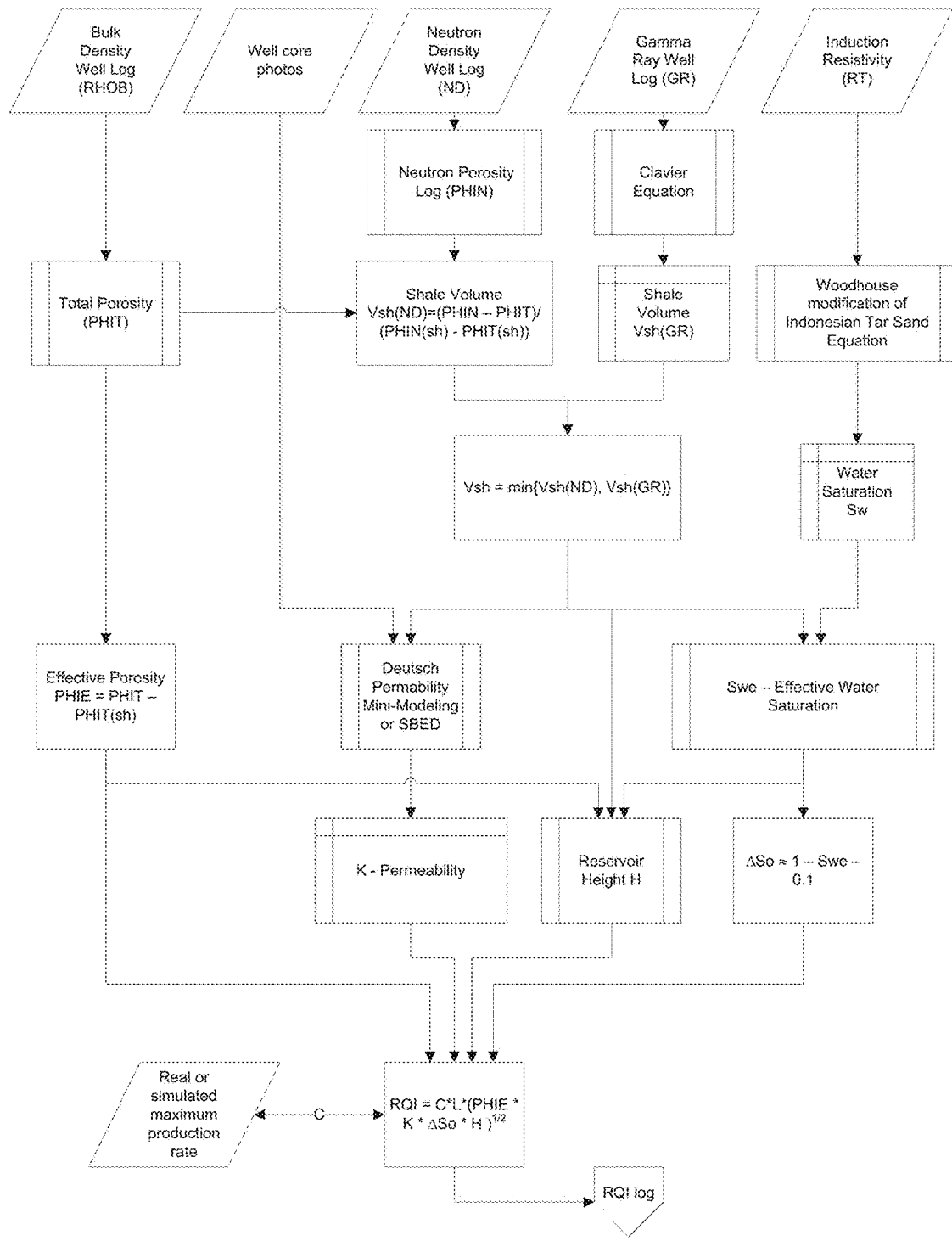

As illustrated by the flow diagram in FIG. 6, in some examples, well logs, such as logs derived directly from measured values, can be used to generate additional well logs. In some examples, these generated well logs can include, but are not limited to, logs for fractional porosity, fractional oil saturation, permeability in any direction, and/ or height or exploitable bitumen in place. FIG. 6 includes example equations and models for deriving, generating or otherwise determining logs and values which may be used to generate a predicted production rate log, and which, in some examples, are based on data representative of physical measurements or attributes of a well or formation. In some examples, some of the petrophysical and/or other equations/ models may be industry standards as described, for example, in "Crain's Petrophysical Handbook", Ross Crain; Woodhouse, R. "Athabasca Tar Sand Reservoir Properties Derived from Cores and Logs", Transactions SPWLA 17th Annual Logging Symposium, Paper T, 1976; Deutsch Permeability—Hosseini, A. H., Leuangthong, O., and Deutsch, C. V., "An integrated Approach to Permeability Modeling Using Micro Models", SPE-117517-PP, 2008; SPE/PS/CHOA Heavy Oil Symposium, Oct. 20-23, 2008, Calgary, AB.

In some examples, the reservoir height H can be one of or the lesser of the height of the formation, the height of the bitumen within the formation, or the height of the first barrier to fluid flow above the base of the bitumen within the formation. The reservoir height can be measured from the base of the formation, the base of the bitumen, or the elevation of a well placed in the formation.

In some examples, some or all of the generated well logs may be generated by the processor(s) 210 of device 205 from received or accessed well log data. In some examples, some or all of the generated well logs may have been previously generated by a remote, field 240 or other device and may be stored at and accessed/received from one or more storage device(s) 225, 215 and/or memory(ies) 215.

At 520, processor(s) can be configured to generate a predicted production rate log for each of one or more wells based on the received or generated well logs. In steam-assisted gravity drainage (SAGD) hydrocarbon production techniques, the estimated maximum production rate can be determined by the equation:

$$Q = 2L\sqrt{\frac{2\Phi\Delta S_o K g \alpha H}{m v_s}}$$

wherein Q is the oil rate, L is the horizontal length of the well, Φ is the fractional porosity, $\Delta S_o$ is the difference between initial oil saturation and residual oil saturation to steam, K is permeability, g, is the acceleration due to gravity, α is the thermal diffusivity of the reservoir, H is the reservoir height, m is a constant between 3 and 4 depending on the oil viscosity to temperature relation, and $v_s$ is the kinematic viscosity of crude at steam temperature.

In some examples, by combining the values that are generally constant over a large area, the equation can be expressed as:

$$Q = CL\sqrt{\Phi \Delta S_o KH}$$

wherein C is an estimated constant. In some examples, processor(s) can be configured to calculate C for a reservoir based on measured maximum production rate data for one or more wells associated with the reservoir. In some examples, processor(s) can be configured to calculate C using a prediction simulator such as Computer Modeling Group Ltd.'s STARS software. In some examples, the simulator can be configured to divide a reservoir into cells and to solve differential equations at the cell boundaries to determine values for calculating or estimating C.

In some examples, the processor(s) can be configured to determine C based on a measured and/or simulated production rate for one or more wells. The processor(s) can be configured to obtain Q by dividing by the length of the respective one or more wells. Based on the values for Q, L, $\Phi$, $\Delta S_o$, K and H for each well for which production rates were measured or simulated, the processor(s) can apply the equation above to estimate the value of C for each well.

In some examples, the processor(s) can be configured to estimate C for an entire region/project/resource, etc using a measure of a central value for C (e.g. mean, average, median, mode values). In some examples, the overall estimate for C may be based on the estimated C values for each well and the well locations relative to each other.

Figure 8:
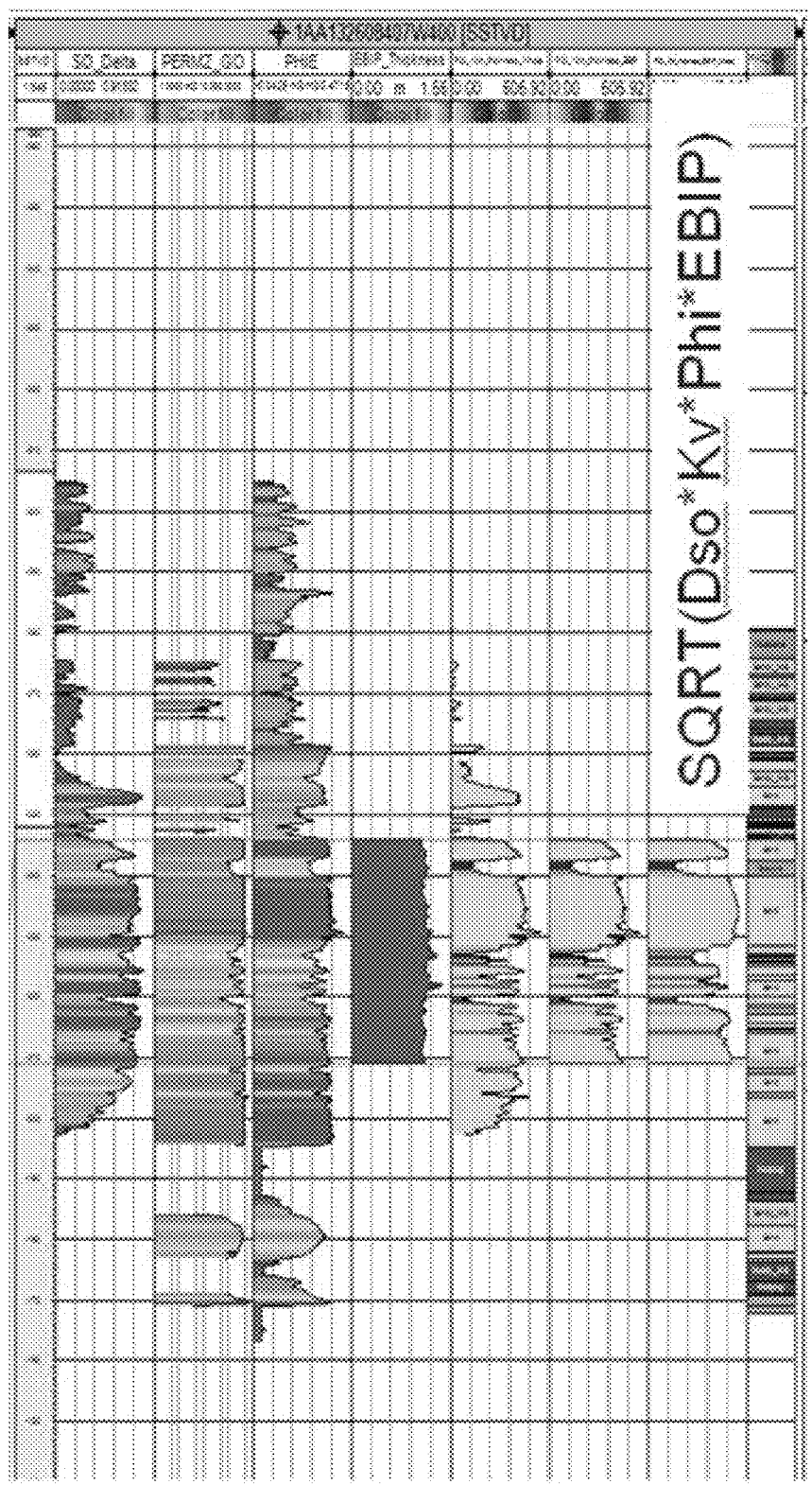
FIG. 8 is a chart showing example well log data.

In some examples, with this later equation, the processor (s) at 520 can be configured to generate a predicted production rate log for one or more wells based on each well's respective porosity, saturation, permeability, and height or exploitable bitumen in place (EBIP) logs. An illustrative example of well logs and the resulting predicted production rate log can been seen in FIG. 8.

At 530, one or more processor(s) 210 and/or other aspects of device(s) 205 may be configured to receive or generate a field dataset for the subterranean formation, the field dataset including field data (such as seismic, electromagnetic, electrical resistivity and/or gravity data) at different points or locations within the 3D volume of the subterranean formation. In some examples, the field dataset can be visualized as a 3D grid or mesh of values from the collected data from seismic sensors and the like.

In some embodiments, processor(s) 210 and/or other aspects of device(s) 205 may be configured to the field dataset may be configured to generate the field dataset in a defined grid of any spacing. In some examples, field data samples can be placed into the defined grid based on their geometry relative to the grid.

In some examples, seismic or other field data may be acquired at a specified sampling rate to obtain desired grid data granularity. For example, seismic sampling rates may affect the collected data grid spacing in the vertical direction. In some instances, a sample rate of 1 ms may provide a vertical grid data granularity of 1 meters.

The spatial sampling of data in a grid may be related to one-half the spacing between the source(s) in one direction and the sensor(s) in the other direction. For example, when source(s) and sensor(s) are spaced 20 meters apart, the horizontal grid data granularity may be 10 meters by 10 meters.

By combining the above, example sampling rate and source/sensor spacing, the 3D spatial grid may be 10 m×10 m×1 m. Other spacings and sampling rates may also be used.

In some examples the field dataset can include a grid of data representing density, impedance, reflectivity, water saturations and the like.

Figure 7:
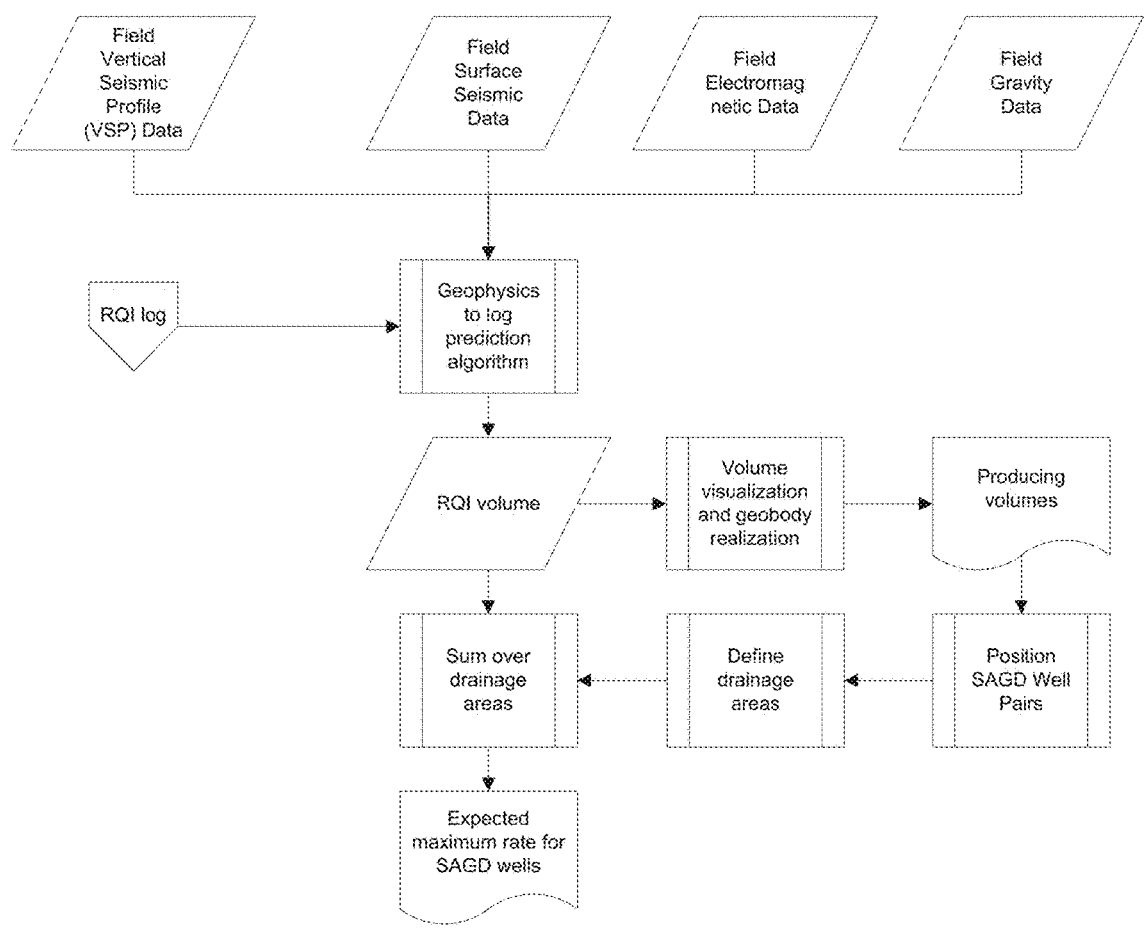

With reference to FIG. 7, in some examples, field datasets, such as data derived directly from measured values, can be used to generate additional data grids. In some examples, these generated data grids can include, but are not limited to, 3D logs/arrays/grids for porosity, saturation, permeability, and/or height or exploitable bitumen in place.

In some examples, some or all of the generated field data grids may be generated by the processor(s) 210 of device 205 from received or accessed field data. In some examples, some or all of the generated field data grids may have been previously generated/transformed by a remote, field 240 or other device and may be stored at and accessed/received from one or more storage device(s) 225, 215 and/or memory (ies) 215.

For example, it has been observed that, in some instances, well logs used for the predicted production rate log (e.g. fractional porosity logs, fractional oil saturation logs, and permeability logs) show a strong correlation to the density logs. Therefore, in accordance with aspects of the present disclosure, predicted density logs from wide-angle seismic or other field data may be used to generate a predicted production rate log. Similarly, in some examples, other attributes of the seismic or other field data may be related to the predicted rate log. In some examples, a collection of such attributes may be determined and used together to predict the predicted rate log via multi-linear regression or neural network methods.

At 540, identifying the predicted production rate log(s) from the well data as target(s), processor(s) can be configured to determine a transform relating the field data and the predicted production rate log(s) from the well data.

In some examples, the processor(s) can be configured to determine a transform by applying linear and/or multi-linear regression. In some examples, the processor(s) can be configured to determine a transform by generating/training a neural network, agenetic algorithm, or any other multi-parameter estimation method.

In some examples, determining a transform may include generating a weighted equation, neural network or other equation or model which defines or models a relationship between the desired output log(s) (e.g. predicted production rate log) from well log data and the seismic or other field datasets. In some examples, the field datasets can be elastic logs (e.g. sonic, shear-wave sonic, density) and/or properties that may be calculated from the elastic logs (e.g. Young's modulus, Poisson's ratio, compressibility, etc.). In some examples, the processor(s) can be configured to use the seismic response equation, $R(\theta)$, above or a similar amplitude versus offset or other equation to identify the elastic properties which are related to the desired output log(s) (e.g. predicted production rate log). In some examples, the elastic properties may include P-impedance, S-impedance and density.

In some examples, the processor(s) can be configured to calculate the identified elastic properties using the seismic response or other equation, and the desired output log(s) using the elastic properties at the well locations. Based on the desired output log(s) from the elastic properties and the output log(s) from the well data, the processor(s) can be configured to generate a transform using a multi-linear regression, neural network, genetic algorithm or other suitable model.

Figure 9:
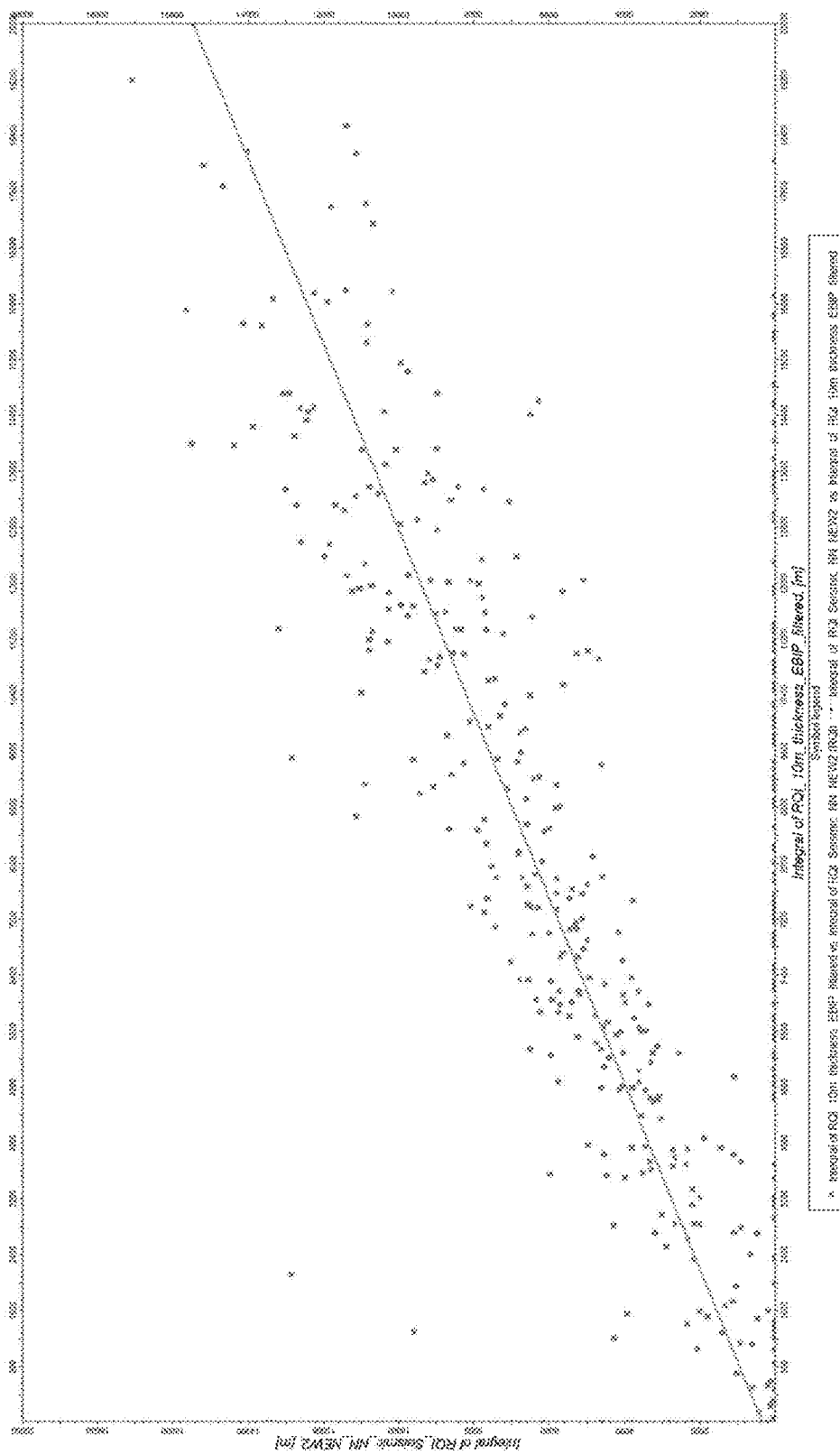
FIG. 9 is a chart showing an example linear regression.

FIG. 9 shows a chart illustrating a linear regression and a resulting transform relating the field (seismic) data and the predicted production rate log(s).

At 550, using this transform, the processor(s) can be configured to generate a predicted production rate for each location of the volume of the subterranean formation for which field data was received/generated.

In some examples, the processor(s) can be configured to generate the transform and/or generate the predicted production rate for each location using any of the equations described herein (e.g. the equation for Q above) or otherwise. In some embodiments, the processor(s) can be configured to apply these equations based on a constant factor C which can, in some examples, be measured or simulated based on well data as described above or otherwise.

In this manner, the methods, systems and devices described herein can generate a grid of predicted production rates i.e. a value for each 3D unit in a subterranean formation volume. In some examples, this grid of predicted production rates may provide a more refined/granular characterization of the value/viability of specific portions of a reservoir in three dimensions between core holes. In some examples, as the grid is based on data associated with physical field data between the wells, the predicted production rates may be more accurate than rough estimates taken by averaging between wells.

In some examples, the 3D grid may provide a visual representation for quantifying production, resources, cost, risk and/or value for specific portions of a resource.

At 560, the processor(s) may optionally be configured to generate a visual 3D map or representation of the resource's predicted production rates on a per unit volume basis. In some examples, the processor(s) may be configured to sum or otherwise aggregate the production rates over identified drainage areas of the resource/formation.

At 570, the processor(s) may receive data or inputs identifying locations/positions of wells and/or drainage areas. In some examples, these wells may be existing or prospective wells. Based on the unit volume grid of predicted production rates and/or other predictions and the locations/positions of the inputted well/drainage area data, the processor(s) may be configured to sum or aggregate the associated predicted production rate units to generate a predicted production rate, cost, and/or economic viability for the inputted wells/drainage areas.

Figure 10:
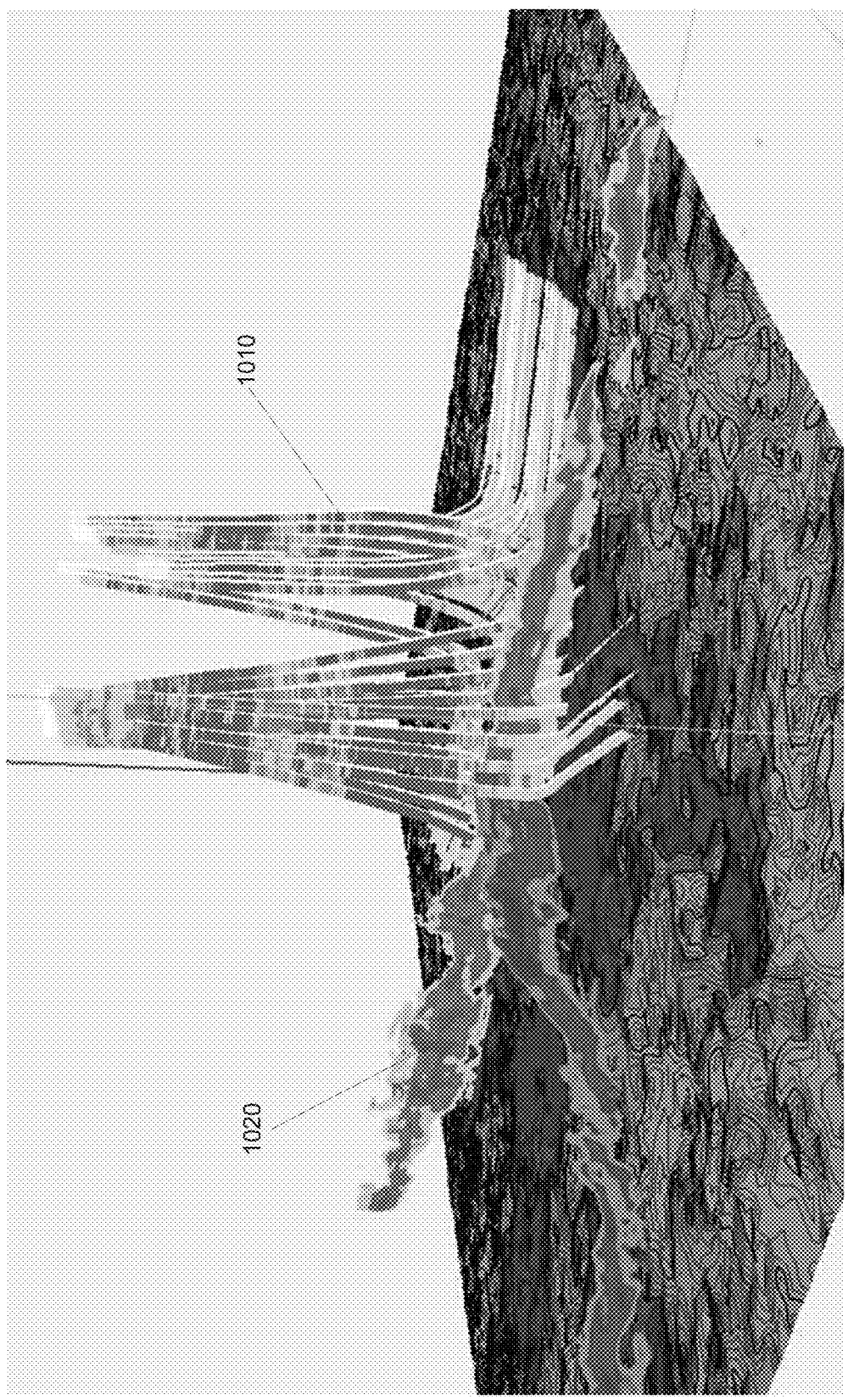
FIG. 10 is a visual representation of example predicted production rates in three-dimensions as illustrated along wells and through an example geological formation.

For example, FIG. 10 illustrates a perspective view illustrating a three-dimensional visual representation of predicted production rates along different wells 1010 and through different regions of a subterranean resource 1020. The different shades of grey (or color if visible) represent different levels predicted production rates for each unit volume included in the visual representation.

Figure 11:
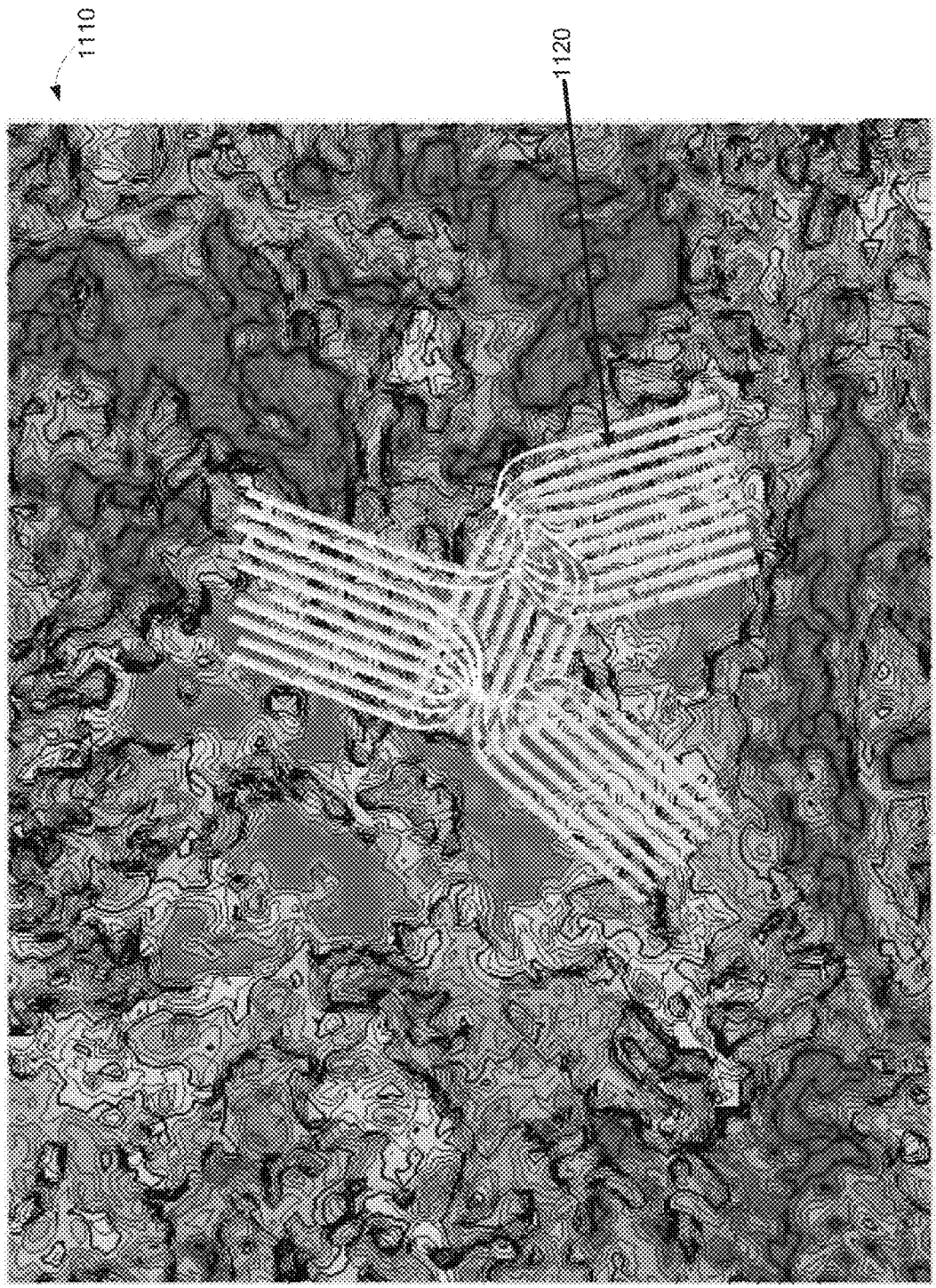
FIG. 11 is a top view map of an example drainage area showing different predicted production rates.

For example, FIG. 11 illustrates a top view map 1110 of a drainage area showing the different predicted production rates for the various regions, and some SAGD well locations 1120. In some examples, the top view may be generated by summing volumetric unit predicted production rates below the surface of each unit area of the top view visual representation 1110. In some examples, this may include summing wedges, boxes, columns, etc. of per unit volume predicted production rates below the surface of each unit area.

Figure 12:
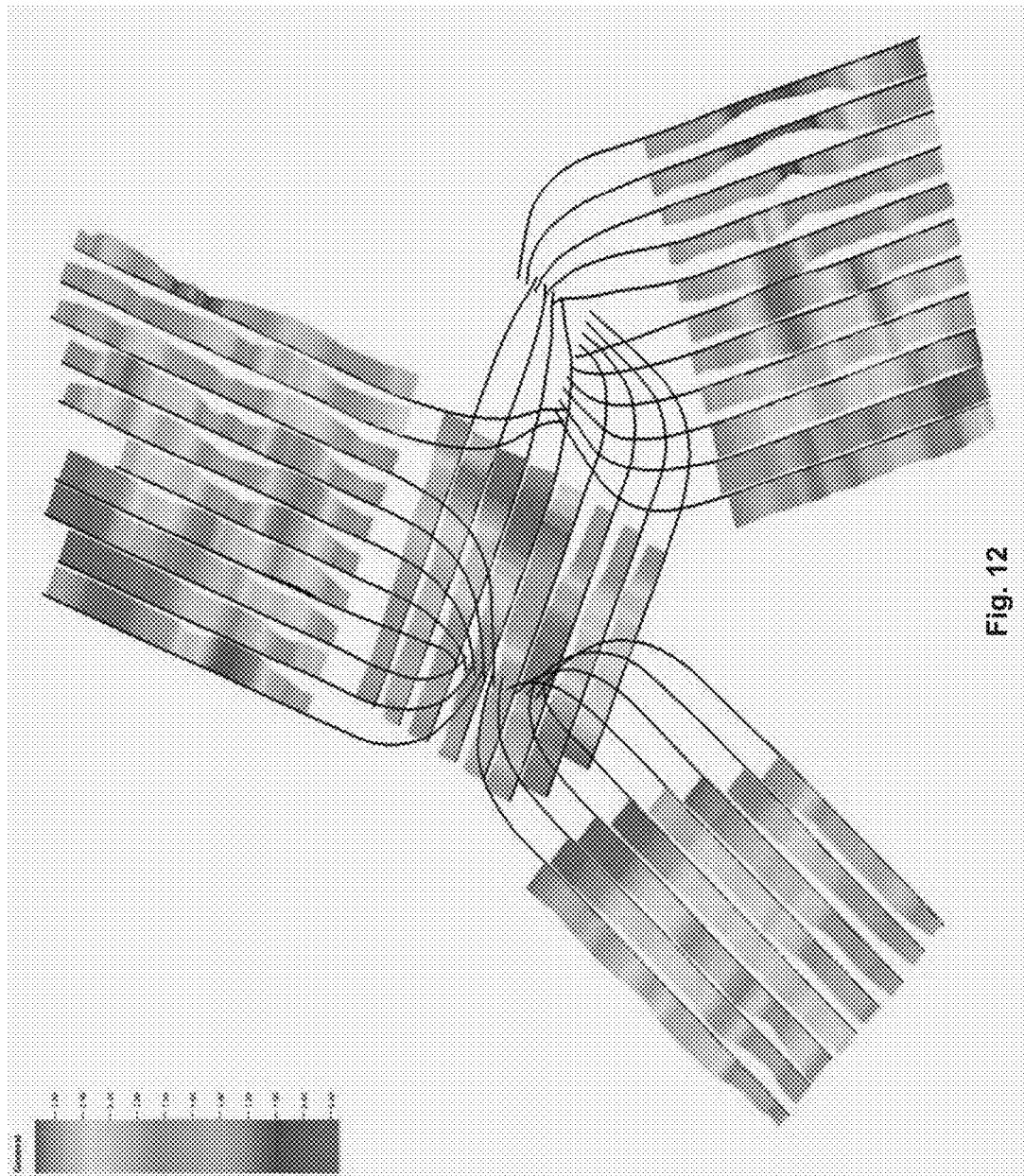
FIG. 12 is a visual representation of example predicted production rates as they vary along the length of the various wells.

FIG. 12 shows a visual representation of the predicted production rates as they vary along the length of the identified wells. In some examples, this granular modeling of production rates may provide information to determine not only the potential best location(s) for well development, but also the potentially most valuable portions of those wells.

In some embodiments, the methods and devices described herein may be computationally more efficient than previous methods wherein static formation properties such as porosity, saturation and permeability were individually estimated over a 2D area using multi-linear regression or neural networks for each property. These 2D maps were then combined to predict a maximum 2D rate map.

In contrast, in addition to creating 3D granular information regarding a dynamic property such as production rate, the methods, devices and systems described herein may, in some embodiments, decrease computation requirements by a factor of three by only using a single multi-linear regression, neural network or other model. In some embodiments, the reduction in computational steps by the methods, devices and systems described herein may reduce (compounding) error bars on the estimated output log(s).

In some example embodiments, the methods and devices described above may be similarly applied to generate 3D granular data sets for predicted steam use, energy use, water use, steam-to-oil ratios and/or water-to-steam ratios. In some examples, this may involve generating log(s) for these predicted attributes based on well data at 520; determining, at 540, a transform relating seismic data to the well predicted logs; and based on the transform, at 550, generating a predicted 3D data set for one or more of these predicted attributes. In some examples, since these predicted attributes may affect the economics of a well or a project, the methods and devices described herein may similarly be used to predicting the economic viability of a well/project/resource/etc.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. A method of detecting reservoir properties over a three-dimensional volume of a subterranean formation, the method comprising:
   obtaining, well logs from core samples or borehole devices of at least one well in the subterranean formation;
   generating, with at least one processor, from the well logs a predicted production rate log for the at least one well;
   obtaining a field dataset for the subterranean formation, the field dataset including field data collected for locations in 3-dimensions of a volume of the subterranean formation with a plurality of sensing devices positioned to remotely detect the field data for the locations of the volume;

identifying the predicted production rate log for the at least one well as one or more targets, determining a transform relating the field data and the predicted rate log for the at least one well; and using the transform, generating a predicted production rate for each of the locations in 3-dimensions of the volume of the subterranean formation.

2. The method of claim 1 wherein determining the transform comprises applying at least one of a linear regression, a genetic algorithm, a neural network analysis, or a multi-parameter estimation method.

3. The method of claim 1 wherein the well logs include logs for porosity, saturation, permeability and bitumen column height.

4. The method of claim 1 wherein the field data includes at least one of seismic data, gravity data, electrical resistivity data or electro-magnetic data.

5. The method of claim 1 wherein the field data includes wide-angle seismic data.

6. The method of claim 5 wherein the wide-angle seismic data is collected from seismic waves having an angle of incidence greater than 45 degrees.

7. The method of claim 1 wherein the field data includes density data.

8. The method of claim 1 wherein the predicted production rate log generated from the well logs is based on the equation:

$$Q = C L \sqrt{\Phi \Delta S_o K H}$$

where C is a constant, L represents a horizontal length of the well, $\Phi$ represents fractional porosity, $\Delta S_o$ represents a difference between initial oil saturation and residual oil saturation to steam, K represents permeability, and H represents reservoir height.

9. The method of claim 1 comprising: generating a three-dimensional visual representation of at least a portion of the subterranean formation using the predicted production rates for the locations of the volume corresponding to the portion of the subterranean formation.

10. The method of claim 1 comprising: determining a predicted production rate for identified drainage areas or positioned wells using the predicted production rates for the locations of the volume corresponding to locations of the identified areas or positioned wells in the subterranean formation.

11. The method of claim 1 comprising: determining a constant factor C for generating the predicted production rate log for the at least one well and the predicted production rate for each location of the volume of the subterranean formation; wherein determining the constant factor C is based on measured or simulated well data.

12. A device for expanding reservoir properties from well log data over a three-dimensional volume of a subterranean formation, the device comprising: at least one processor configured for:

obtaining well logs from core samples or borehole devices of at least one well in the subterranean formation;

generating from the well logs a predicted production rate log for the at least one well;

obtaining a field dataset for the subterranean formation, the field dataset including field data collected for locations in 3-dimensions of a volume of the subterranean formation with a plurality of sensing devices positioned to remotely detect the field data for the locations of the volume;

identifying the predicted production rate log for the at least one well as one or more targets, determining a transform relating the field data and the predicted rate log for the at least one well; and using the transform, generating a predicted production rate for each of the locations in 3-dimensions of the volume of the subterranean formation.

13. The device of claim 12 wherein determining the transform comprises applying at least one of: a linear regression, a genetic algorithm, a neural network analysis, or a multi-parameter estimation method.

14. The device of claim 12 wherein the well logs include logs for porosity, saturation, permeability and bitumen column height.

15. The device of claim 12 wherein the field data includes at least one of seismic data, gravity data, electrical resistivity data or electro-magnetic data.

16. The device of claim 12 wherein the field data includes seismic data collected from seismic waves having an angle of incidence greater than 45 degrees.

17. The device of claim 12 wherein the field data includes density data.

18. The device of claim 12 wherein the predicted production rate log generated from the well logs is based on the equation:

$$Q = C L \sqrt{\Phi \Delta S_o K H}$$

where C is a constant, L represents a horizontal length of the well, $\Phi$ represents fractional porosity, $\Delta S_o$ represents a difference between initial oil saturation and residual oil saturation to steam, K represents permeability, and H represents reservoir height.

19. The device of claim 12 wherein the at least one processor is configured for: generating a three-dimensional visual representation of at least a portion of the subterranean formation using the predicted production rates for the locations of the volume corresponding to the portion of the subterranean formation.

20. The device of claim 12 wherein the at least one processor is configured for: determining a predicted production rate for identified drainage areas or positioned wells using the predicted production rates for the locations of the volume corresponding to locations of the identified areas or positioned wells in the subterranean formation.

21. The device of claim 12 comprising: the at least one processor is configured for: determining a constant factor C for generating the predicted production rate log for the at least one well and the predicted production rate for each location of the volume of the subterranean formation; wherein determining the constant factor C is based on measured or simulated well data.

22. A non-transitory computer-readable medium or media having stored thereon, computer-readable instructions which when executed by at least one processor, configure the at least one processor for:

obtaining well logs from core samples or borehole devices of at least one well in the subterranean formation;

generating from the well logs a predicted production rate log for the at least one well;

obtaining a field dataset for the subterranean formation, the field dataset including field data collected for locations in 3-dimensions of a volume of the subterranean formation with a plurality of sensing devices positioned to remotely detect the field data for the locations of the volume;

identifying the predicted production rate log for the at least one well as one or more targets, determining a transform relating the field data and the predicted rate log for the at least one well; and using the transform, generating a predicted production rate for each of the locations in 3-dimensions of the volume of the subterranean formation.

* * * * *